United States Patent [19]
Bansal et al.

[11] Patent Number: 5,285,441
[45] Date of Patent: Feb. 8, 1994

[54] ERRORLESS LINE PROTECTION SWITCHING IN ASYNCHRONOUS TRANSER MODE (ATM) COMMUNICATIONS SYSTEMS

[75] Inventors: Narendra K. Bansal, Londonderry, N.H.; Sid Chaudhuri, East Brunswick, N.J.; Shahrukh S. Merchant, Londonderry, N.H.; Donald J. Wemple, Plymouth, Vt.

[73] Assignee: AT&T Bell Laboratories, Murray Hill, N.J.

[21] Appl. No.: 852,604

[22] Filed: Mar. 17, 1992

[51] Int. Cl.$^5$ ............................................. H04L 1/22
[52] U.S. Cl. .................................. 370/16; 370/108; 371/8.2; 340/827
[58] Field of Search ............... 370/13, 16, 60, 60.1, 370/94.1, 94.2, 100.1, 108; 340/825.21, 827, 825.01; 371/8.2, 68.2; 379/279

[56] References Cited

U.S. PATENT DOCUMENTS 4,477,895 10/1984 Casper et al. ........................ 370/16
5,051,979 9/1991 Chaudhuri et al. .................. 370/16
5,153,578 10/1992 Izawa et al. ...................... 370/16 X

OTHER PUBLICATIONS

C. P. Bates et al. "Effectiveness Of Error Correction And Errorless Frequency Diversity Switching In A Multipath Environment," IEEE Int'l Conf. on Communications '87, Seattle, Wash., USA, Jun. 7–10, 1987, pp. 0826–0830.

Primary Examiner—Douglas W. Olms
Assistant Examiner—Melvin Marcelo
Attorney, Agent, or Firm—Eugene S. Indyk

[57] ABSTRACT

An errorless line protection apparatus involves receipt of data from an active line and a standby line. A determination is made as to whether the data from the active line leads or lags the data on the standby line. A switching system directs the leading data to a lead channel containing a controllable amount of time delay up to the maximum amount that the leading data is expected to led the lagging data. Lagging data is directed to a lag channel. A selected one of the data from the lead channel or the lag channel is delivered to an output line.

47 Claims, 5 Drawing Sheets (d) SWITCHED ERRORLESSLY FROM SIDE 1 TO SIDE 0 EVEN AFTER SIDE 0 LENGTH CHANGED (a) SIDE 1 ACTIVE (b) INACTIVE SIDE LENGTH CHANGED, IDLE CELLS DROPPED FROM RAM TO MAKE IT AVAILABLE FOR SHORTER SIDE 0

(c) RAM AVAILABLE FOR THE CURRENT SHORTER SIDE 0

(d) SWITCHED ERRORLESSLY FROM SIDE 1 TO SIDE 0 EVEN AFTER SIDE 0 LENGTH CHANGED

ERRORLESS LINE PROTECTION SWITCHING IN ASYNCHRONOUS TRANSER MODE (ATM) COMMUNICATIONS SYSTEMS

FIELD OF THE INVENTION

This invention relates to errorless line protection switching in communications systems. More particularly, this invention relates to errorless line protection switching in asynchronous transfer mode (ATM) communications systems and the like.

BACKGROUND OF THE INVENTION

It is now possible and desirable to transport very high bit rate digital signals over long distances in communications networks. For example, transmission of digital signals at rates of up to 2.4 Gb/sec. or more over distances of up to 100 km. or more is now possible and is actually used in some advanced communications networks, such as those using optical fiber as the transmission medium.

One particularly attractive high speed communications network, which can conveniently handle such large amounts of digital data, uses the so-called asynchronous transfer mode protocol in which packets or cells of digital data are transported and switched through an optical fiber based network. This kind of network is particularly attractive because the cell based nature of switching reduces the cost of constructing and maintaining the network and increases the efficiency with which available bandwidth may be utilized.

As the amount of data carried on each line of a communications systems becomes greater, it becomes increasingly important to take countermeasures against failure and disruptions of service, such as those disruptions which are caused by a break in the optical fibers. The main countermeasures taken against disruption in prior communications systems include provision of a redundant standby line in prior communications systems include provision of a redundant standby line in addition to a normally active line. The standby line carries the same network user data as the active line. Protection switching from the active line to the standby line is invoked in the event of a disruption of service on the original active line. The data sent on the active line and the data sent on the standby line travel physically diverse paths from their source to their destination. This physical diversity results in differing amounts of travel time for the user data from the source to the destination. The arrival of user data at the destination from the active line thus will either lead or lag the arrival of the same data transmitted on the standby line because of different amounts of delay present in the active and standby lines. This difference in delay is caused by things such as different path lengths between source and destination for the active and standby lines and different circuit elements and characteristics in those two lines.

Lagging or leading data streams flowing in the active and standby lines require that special measures be taken to ensure that there is no data loss or error when a receiver switches from an active line to a standby line. Various forms of hitless or errorless switching systems have been proposed but none of them are very applicable to high speed, high capacity communications systems such as ATM communications systems. For example, a technique for accomplishing errorless switching of synchronous digital hierarchy (SDH) signals from one route to another is described in Chaudhuri et al. U.S. Pat. No. 5,051,979. However, errorless switching techniques are not available for ATM signals. Those errorless switching techniques developed for signals such as SDH signals are not readily applicable to errorless switching of ATM signals, particularly because of the asynchronous nature of the ATM signals. Accordingly, an unsatisfied need exists for a suitable errorless switching arrangement for ATM signals.

In addition to a general lack of suitable errorless protective switching arrangement for ATM signals, prior errorless switching arrangements have been costly in terms of a large amount of data storage needed to successfully accomplish errorless switching between active and standby lines. This large amount of data storage takes up a large amount of physical space and produces a great deal of heat which must be successfully dissipated. Accordingly, there is an additional need for an errorless switching system having less data storage to reduce the cost of implementing the switching system, the space it occupies, and the heat it produces.

SUMMARY OF THE INVENTION

The needs identified above are satisfied in one example of the invention by an errorless line protection apparatus which comprises an active line which transports user data from a first location to a second location over a first path. The errorless line protection apparatus also comprises a standby line which transports the user data from the first location to the second location over a second physically diverse path. The line protection apparatus includes a means for determining whether or not the user data on the active line leads or lags the user data on the standby line. The amount of lead or lag also is determined. A switching means connects whichever line is carrying the leading user data to the input of a variable delay unit which is capable of providing a time delay for the leading user data up to the maximum amount by which the user data is expected to lead the user data on the lagging line. The line protection apparatus includes a means for adjusting the time delay provided by the variable delay unit so that the leading user data is retarded by an amount which reduces the lead between the user data on the active and standby lines to zero. The line which has been determined to be carrying lagging user data is connected, either directly or through a circuit element capable of providing less delay than that capable of being provided by the variable delay unit, to one input of a switching unit. The output of the variable delay unit is connected to a second input of the switching unit. The switching unit connects one of the signals on the two inputs to an output line in response to command signals. The switching unit selectively switches between the user data on the active and standby lines in an errorless manner because of the alignment of the user data on those lines prior to making the switch.

One aspect of particular examples of this invention which is particularly pertinent to asynchronous transfer mode communication systems is that the delay provided by the variable delay unit may be changed by addition or delection of idle cells from an ATM bit stream. This aspect can be used to conveniently switch an ATM signal from one path to another in an errorless manner even if the standby path length changes during a service period.

Alignment determinations may be made without affecting user traffic, so there are no unnecessary phase changes. This is because the determination of the time delay between the leading and lagging sides is made based on normal traffic only, and not by the presence of a special alignment cell sent just prior to switching. There are many resultant benefits. For example, there is no need to define, standardize, or create special alignment cells; no channel bandwidth is used for any special alignment cells; a few missing or errored cells can be tolerated; alignment is maintained continuously, so switching can be done immediately on command, and it can further be verified that alignment is achieved before the switch is performed; and delay differences can be adjusted gradually, to minimize the effect of downstream disturbances caused by an abrupt addition or removal of delay.

DETAILED DESCRIPTION

Figure 1:
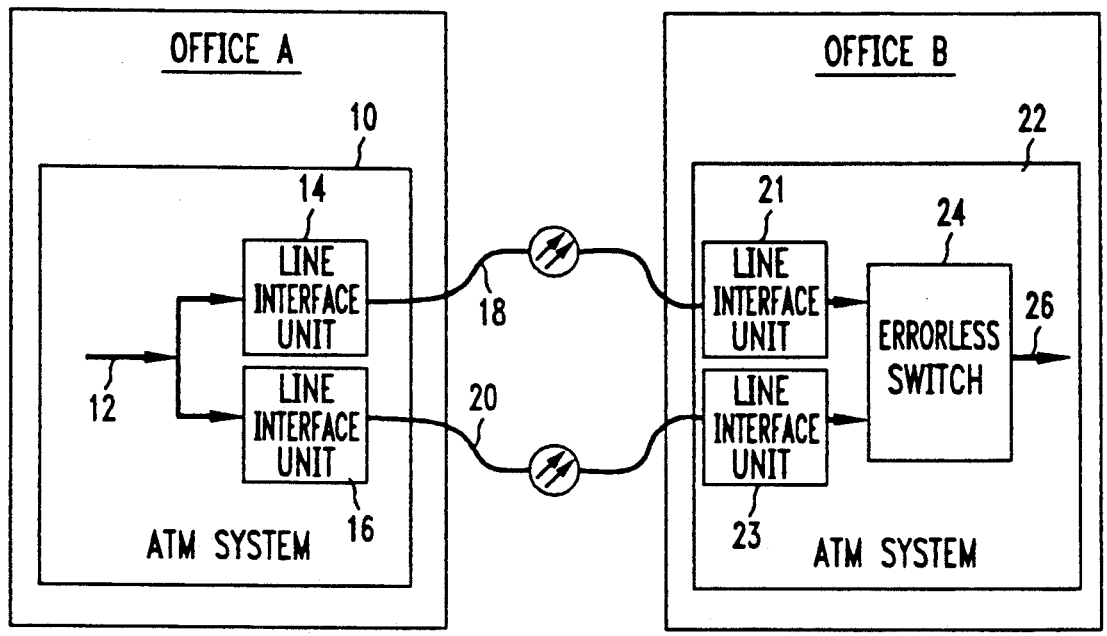
FIG. 1 is a high level schematic diagram of a relevant portion of an asynchronous transfer mode communication system having errorless protection line switching in accordance with the principles of this invention.

FIG. 1 shows a portion of a communication system which transports asynchronous transfer mode (ATM) signals from one location to another location. The portion of the ATM communication system shown in FIG. 1 comprises two offices A and B, which may be two of the switching offices in the ATM communications system. Office A contains an ATM system 10 which handles digital signals in an ATM format appearing on line 12. The signals on line 12 are written into two line interface units 14 and 16 which then direct those ATM signals to the office B via lines 18 and 20. Either line 18 or line 20 may be an active line, with the other line being a standby line redundant to the active line. The discussion below assumes, for example, that line 18 is the active line and line 20 is the standby line. The active line 18 and the standby line 20 may be optical fibers connecting the two offices A and B. The ATM signals on line 18 are received by a line interface unit 21 in an ATM system 22 in the office B. The ATM signals on line 20 are received by a line interface unit 23 in the ATM system 22 in the office B. The ATM signals received by the line interface unit 21 are directed to one input of an errorless switch 24 in the ATM system 22. The ATM signals received by line interface unit 23 are directed to a second input of the errorless switch 24. The errorless switch 24 selectively directs the ATM signals received on one of its two inputs to an output line 26. During normal operation, the errorless switch 24 directs the ATM signals received from the active line 18 to the output line 26. When it becomes impossible or impractical for some reason to continue to connect the signals from the active line 18 to the output line 26, such as in situations where there is a preplanned disruption of the signals on line 18 which may involve line 18 being cut for some reason, then the errorless switch 24 will switch to a condition where the redundant ATM signals received from line 20 are directed to the output line 26. As discussed in more detail below, the errorless switch 24 switches between sending the ATM signals received from the active line 18 and sending the ATM signals received from the standby line 20 to the output line 26 in an errorless manner so that no data is lost and no errors are introduced as a result of the switching operation.

A better understanding of the example of the invention described here is facilitated by the following brief description of pertinent parts of an example of a typical ATM signal. An ATM signal comprises a cell which is composed of a predetermined number of digital bytes of information. For example, each cell of the ATM signal may comprise 53 eight bit bytes of digital information. Each cell is made up of two main parts. One part of the cell is called the header and it contains information used for networking and administrative purposes. That information includes information such as identification of the destination of the cell, header error checking information, cell loss priorities, and identification of cell type. In the example of a 53 byte cell identified above, the first 5 bytes of the cell may be the header portion of the cell. In addition to the header, the remainder of the cell comprises a payload for carrying information or data which a customer or user of the communications network wishes to send to a predetermined destination. In the example referred to above, the remaining 48 bytes of the 53 byte cell comprise the payload carrying this customer information. As mentioned above, the header of each cell carries with it a destination address and each pertinent element of the network reads part or all of this destination address in the header and directs each cell through the network to its intended destination in accordance with the destination address encoded in the header. Each cell thus is transported through the communications network independently cell by cell in a pure ATM system. As described below, the ATM cells may be transported from office A to office B in a way other than a pure ATM mode. For example, the ATM cells may be transported from office A to office B as the payload of a synchronous digital hierarchy (SDH) signal.

In an ATM communications network, there are several types of cells. User cells are those which carry the network users' data to intended recipients in the payload portion of each user cell. The objective of the network is to transport these user cells from one location to another. An additional type of cell which may be found in an ATM signal is an operation, administration, and maintenance (OAM) cell which may be generated by the network elements to maintain and administer the network. For example, special test cells may be produced and sent through predetermined parts of the network to check the performance of the network. ATM signals in the network may also contain idle cells.

These idle cells are needed to maintain a continuous back to back cell stream through the network when there are no user or OAM cells. Idle cells may be generated or discarded as necessary by an ATM network element to compensate for the difference between the incoming and outgoing user cell rates in a network element.

During errorless switching, idle cells may be added to or deleted from the ATM cell streams flowing from the outputs of the network elements. OAM cells used for administration and maintenance purposes between network elements should not be added to or deleted from the cell streams in the active and redundant lines by the errorless switching apparatus in accordance with the principles of this invention. Insofar as OAM cells generally carry useful data and appear equally on the active and standby sides, they should be regarded as user cells in the operation of the errorless switching apparatus of this invention and shall henceforth be assumed to be included in the term "user cell" unless otherwise specified. Basically, those cells in the active line which are identical and redundant to those in the standby line and are not idle cells should not be added, deleted, or changed during the operation of this invention.

In the apparatus of FIG. 1, the two line interfaces 14 and 16 in office A receive identical streams of user cells. These cells can be transported from office A to office B in either a pure ATM mode or they can be mapped onto another signal format for transport. For example, the ATM cells can be mapped onto a synchronous digital hierarchy (SDH) format for transport to office B. In this case, the cell stream becomes the payload of the SDH signal. Specifically, the two interfaces 14 and 16 in office A map the identical cell streams onto two identical SDH signals which are then directed to office B on lines 18 and 20. During this mapping operation, the two interfaces 14 and 16 can add the same idle cells to their respective cell streams. The interfaces 14 and 16 can also discard the same idle cells from their respective cell streams. The cell streams from the two interfaces 14 and 16 are identical because they contain the same idle cells and user cells in the same sequence.

The cell streams from interfaces 14 and 16 are directed to office B over lines 18 and 20. The two signals on lines 18 and 20, which carry identical user and idle cells are terminated at two separate interfaces 21 and 23 in office B. The interfaces may then separate SDH overhead from the cell streams received from lines 18 and 20 in situations where ATM cells have been mapped onto an SDH format. The interfaces 21 and 23 output pure ATM cell streams to the errorless switch 24. The two cell streams sent to the errorless switch 24 have the same user and idle cells in the same sequence. The objective of the errorless switch 24 is to switch from one side to another without any user cell error, loss, or duplication. The configuration of the switch device is described in more detail in connection with the description of FIG. 2 below.

Figure 2:
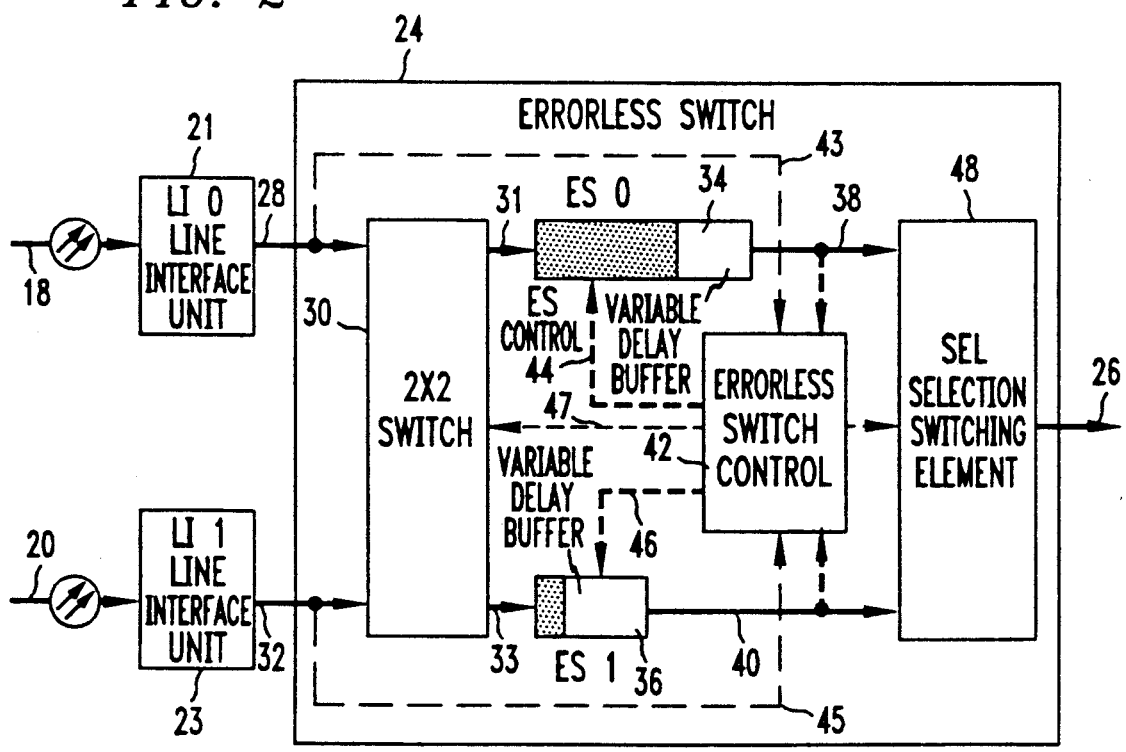
FIG. 2 is a more detailed block diagram of an example of the errorless switch shown in FIG. 1.

FIG. 2 is a more detailed block diagram of the errorless switch 24 shown in FIG. 1. The errorless switch 24 comprises a large size variable delay buffer 34 (ES0) on the shorter path having a time delay capacity at least equivalent to the maximum expected time delay difference in units of number of bits between the two signals on the active and standby lines. The errorless switch 24 may also comprise a smaller size variable delay buffer 36 (ES1) on the longer path which also may be used to align the signals on the active and redundant halves of the circuit. In one example, the size of the variable delay buffer 36 (ES1) may be equal to the size of one or more cells. The errorless switch 24 also has a switching element 30 in front of the two variable delay buffers 34 and 36. This switching element 30 is used to route the signal on the shorter path to the larger variable delay buffer 34 and to route the signal on the longer path to the smaller variable delay buffer 36. The use of this switching element 30 eliminates the need for two equally large variable delay buffers each having the maximum time delay capacity needed to account for differential delays imposed on the active and standby signals. Therefore, the total buffer capacity needed for the errorless switch may be reduced up to half of that needed without the switching element 30. The errorless switch 24 also comprises an errorless selection switching element 48 which can switch from the active signal to the standby signal without a single bit error. An errorless switch control system 42 controls the two variable delay buffers 34 and 36 via control lines 44 and 46 to increase or decrease the delay provided by the variable delay buffers 34 and 36. This control system also permits the selection switching element 48 to accomplish an errorless switch upon external command on line 55 after the two signals in the active and standby paths are aligned. The errorless switch control system 42 also monitors the alignment state of the two signals and initiates a realignment, if necessary.

As mentioned in connection with the description in FIG. 1, ATM signals from an active line 18 are received in a line interface unit 21 and a redundant set of ATM signals are received by a line interface unit 23 from a standby line 20. The ATM signals received by the line interface unit 21 are sent on an output line 28 to one input of the switching element 30 in FIG. 2. The ATM signals received by the line interface unit 23 are directed to another input of the switching unit 30 on a line 32. The switching unit 30, which may be, for example, a 2×2 switch element as shown in FIG. 2, selectively connects one of the lines 28 or 32 to an input of the variable delay buffer 34 and the other of the lines 28 or 32 to the input of the variable delay buffer 36. As indicated schematically by the relative sizes of the buffers 34 and 36 in FIG. 2, the maximum amount of delay able to be provided by the buffer 34 greatly exceeds the amount of delay able to be provided by the buffer 36. In one example of the invention and as described below in connection with a description of FIG. 3, the buffer 36 may be eliminated so that there is no intentional, controllable, or variable delay provided for the signals directed by the switching element 30 to the output line 33.

The switching element 30 is directed by the errorless switch control 42 via a line 47 to switch ATM cells appearing on either one of lines 28 or 32 to the input of the variable delay buffer 34 via a line 31 if the user data in those cells is determined to be leading the user data in the ATM cells appearing on the other of lines 28 or 32. The switching element 30 also directs the ATM cells containing user data on either one of lines 28 or 32 determined to be lagging to the input of the variable delay buffer 36 via an output line 33. The buffers 34 and 36 each provide a variable amount of time delay between the introduction of ATM cells on lines 31 and 33 and the output of the ATM cells on output lines 38 and 40, respectively.

The errorless switch control system 42 is responsive to the inputs to the switching element 30 on lines 28 and 32 to produce control signals on lines 44 and 46 which are directed to the buffers 34 and 36 to control the amount of time delay provided by those buffers. The time delays provided by the buffers 34 and 36 are set so that there is no lag or lead between the user data in the ATM cells appearing on lines 38 and 40. After alignment has been acquired, the control system 42 is also responsive to the differences between the outputs of the buffers 34 and 36 on output lines 38 and 40 to produce control signal to reinitiate the alignment process.

The selection switching element 48 receives the aligned cell streams on lines 38 and 40 and selectively directs the signals on one of the lines 38 or 40 to an output line 26. Because there is no lag or lead between the active and standby signals appearing on lines 38 and 40, the selection switching element 48 may change which signals it is directing to the output line 26 without data error, duplication, or loss.

One example of a procedure of achieving errorless switching with the apparatus of FIG. 2 is as follows. First, the cell boundaries in the active and standby lines may be aligned. This may be accomplished by inserting a delay of up to B-1 bits, where B is the number of bits in a cell, in one or both of the active or standby lines by changing the amount of delay introduced by either one or both of two cell alignment units located in the line interface units 21 and 23. Next, any user cell may be read from the line 28 by the switch control 42 on a line 43 in FIG. 2. A search then is made for the same user cell downstream in the signal from the line 32 up to a certain maximum number of cells downstream, as indicated by the line 45 connecting line 32 to the switch control 42 in FIG. 2. The number of cells in the signal from line 32 is counted during this search until a match is found at the nth cell downstream. If a match is found, another user cell is read from the signal in the line 28. A check then is made to see if the nth cell from the line 32 is identical to the second selected user cell from the line 28. There should be a match n cells downstream if the earlier match was correct. These steps of selecting a user cell from the line 28 and looking for a match in the cells from the line 32 n cells downstream can be repeated as many times as necessary to confirm that the initial match was a correct one. If no match is found for the initially selected user cell from line 28 at a point downstream in the cell stream directed to the variable delay buffer 36 which is less than or equal to the maximum amount, then possibly the signal directed to the variable delay buffer 34 has more delay. In that case, a user cell is selected from the line 32 and a match is sought in the cells on line 28 in the same manner as before with the roles of the signals on lines 28 and 32 reversed. The delays provided by the buffers 34 and 36 may then be adjusted so that the cells appearing on the outputs of the buffers 34 and 36 are aligned. Alignment of these cells permits the selection element 48 to switch between the active and standby lines without data loss or data error. Alignment of the cells on the active and standby lines may be maintained continuously or may be accomplished in response to a special external command to switch from the active line to the standby line. After alignment has been achieved, all cells on lines 38 and 40 are monitored continuously for discrepancies. If differences are found that indicate loss of alignment, the search and alignment processes are reinitiated.

Figure 3:
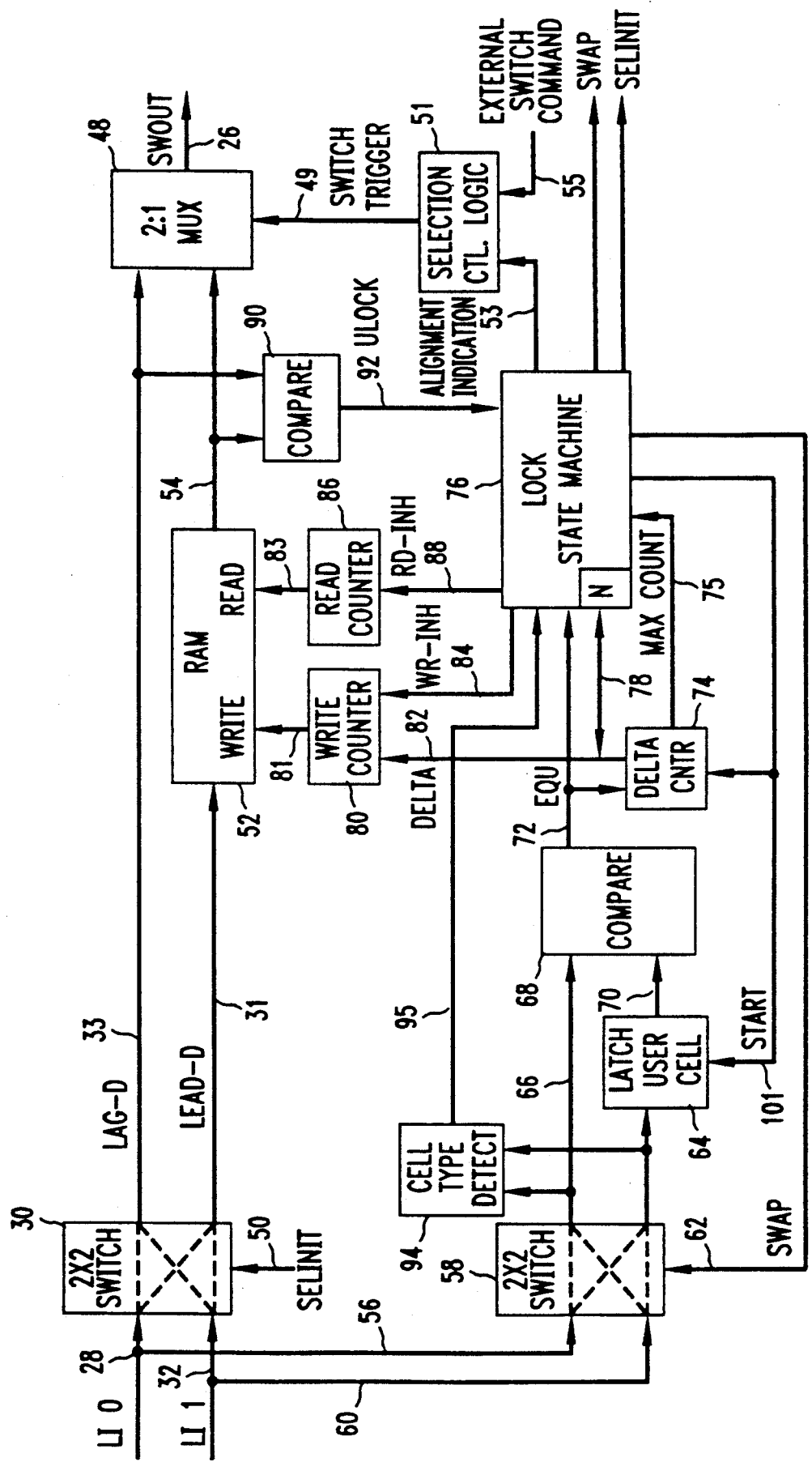
FIG. 3 is a detailed block diagram of another example of the errorless switch shown in FIG. 1.

FIG. 3 shows a detailed block diagram of another example of an errorless switch 24 in accordance with this invention. ATM cells from an active line are received by the apparatus of FIG. 3 on a line 28 from a line interface unit like the one described in connection with the description of FIG. 2. ATM cells from a standby line are received by the apparatus of FIG. 3 on a line 32 from a line interface unit like the line interface unit 23 of FIG. 2. The ATM cells on line 28 are directed to one input of a switching unit 30 and the ATM cells on line 32 are directed to a second input of the switching unit 30. The switching unit 30 is responsive to a selection signal on line 50 to selectively direct the ATM cells on line 28 to a lag channel line 33 or to a lead channel line 31. The switching element 30 is also responsive to the selection signal 50 to direct the ATM cells on line 32 to the other of the lag channel line 33 or the lead channel line 31. As described below, the switching element 30 may direct either of the ATM cells on lines 28 or 32 simultaneously to both the lines 31 and 33.

As mentioned above, due to differing path lengths and differing circuit characteristics in the active and redundant standby lines, the user data in the ATM cell stream on line 28 will either lead or lag the user data in the ATM cell stream on line 32. If the user data on line 28 leads the user data on line 32, then the switching element 30 directs the ATM cells online 28ot the lead channel line 31 and the switching element 30 directs the ATM cells on line 32 to the lag channel line 33. If the user data on line 28 lags the user data on line 32, then the switching element 30 directs the ATM cells on line 28 to the lag channel line 33 and the switching element 30 directs the ATM cells on line 32 to the lead channel line 31. In this example of an errorless switch in accordance with this invention, the ATM cells on the lag channel line 33 are directly connected from the switching element 30 to one input of a selection switching element 48 without any intentional time delay. In the lead channel line 31, on the other hand, a controllable amount of delay is introduced between the output of the switching element 30 and the input of the selection switching element 48. In this regard, the ATM cells on the lead channel line 31 are connected to an input of a random access memory 52, which corresponds to the variable delay buffer 34 shown in FIG. 2. The random access memory 52 serves to delay the appearance of the ATM cells in the lead channel line 31 at a second input 54 of the switching element 48. The time delay provided by the random access memory 52 is variable as determined by a set amount of time between the writing of ATM cells into the random access memory 52 and the reading of those cells out of the random access memory 52. The amount by which such appearance is delayed is set to be an amount such that the lead of the user data on the lead channel line 31 with respect to the user data on the lag channel line 33 is reduced to zero. There thus is no lead or lag between the user data in the ATM cells appearing on the lag channel line 33 and the output line 54 of the random access memory 52. The switching element 48 thus is able to change which line, lag channel line 33 or output line 54 in the lead channel, it connects to an output line 26 without any user data error, duplication, or loss. The switching element 48 is responsive to a switch trigger signal on line 49 produced by a selection control logic element 51 in response to an alignment indication signal on line 53 from a lock state machine 76 and an external switch command signal on line 55. The signal on line 49, thus, is such that the switching element is only able to change which input it directs to the output line 26 when there is no lag or lead in the user cells appearing on the inputs to the switching element 48. No user cell loss, duplication, or error occurs as a result of this switching operation because of the alignment of the user cells.

A circuit for performing an errorless switching operation in accordance with one example of the invention described here accomplishes such switching operation by performing the following sequence of phases:
1. A lead/lag delay calculation;
2. A lead/lag delay confirmation;
3. Path adjustment and alignment;
4. Alignment confirmation; and
5. Alignment monitoring.

These phases are described in detail later on in this description.

This paragraph describes the operation of FIG. 3 for the lead/lag delay calculation phase. The errorless switch of FIG. 3 has a circuit for determining which of the lines 28 or 32 contains leading user data and which of the lines 28 or 32 contains lagging user data. The switch of FIG. 3 also contains a mechanism by which the amount of lead or lag can be determined so that the delay which should be provided by the random access memory 52 can be determined and controlled. The ATM cells on line 28 are directed on line 56 to one input of a switching element 58. The ATM cells on line 32 are directed on line 60 to another input of the switching element 58. The switching element 58 is responsive to a swap signal on line 62 to first direct an arbitrary one of the ATM user cells on either the active or standby lines to be stored in a user cell latch 64. The ATM cells on the other of the active or standby lines are sent on a line 66 to one input of a comparator 68. Another input of the comparator is connected to the output of the user cell latch 64 via a line 70. The comparator 68 compares the ATM cells appearing on lines 66 and 70 and outputs an indication on line 72 as to whether or not the cell in latch 64 is the same as or different from the ATM cells appearing on line 66. A delta counter 74 is responsive to the output of the comparator 68 and produces an output indicating the number of cells separating matching cells in the active and standby lines. If a match is found by the time that a certain preset maximum number $n_{max}$ of cells has passed on line 66 after the latching of a user cell into the latch 64, then a number "n" is sent to a lock state machine 76 on line 78. The number n indicates by how many cells the user data in the ATM cells directed onto line 66 by the switching element 58 lags the user data in the ATM cells directed to the latch 64 by the switching element 58. If no match is found by the comparator 68 by the time the maximum number of cells $n_{max}$ has passed through the comparator on line 66, a maximum count signal is sent on line 75 to the lock state machine 76. Then it is assumed that the original prediction about which set of user data on lines 28 or 32 is leading was wrong. In that case, the swap signal generated by the lock state machine 76 on line 62 directs the switching element 58 to change the line 28 or 32 from which an ATM user cell is to be stored in the latch 64. Such a swap signal is produced in response to the count in the delta counter 74 reaching the aforementioned maximum count as indicated by the signal on line 75. Cells in the line from which a cell was not retrieved and stored in latch 64 are again directed to one input of the comparator 68 on the line 66. The comparator again looks for a match between a cell on line 66 and the user cell stored in the latch 64. The counter 74 determines the number of cells between the user cell in latch 64 and a user cell which matches that stored user cell coming on line 66. The number of cells n determined by the count in counter 74 when a match is found is identified to the lock state machine 76 on line 78.

This paragraph describes the operation of FIG. 3 for the lead/lag delay confirmation phase. In this regard, procedure of the lead/lag delay calculation phase described in the previous paragraph is repeated as follows. Another user cell is stored in latch 64 and it is confirmed that the same cell is present on line 66 n cells later, where n is the same number stored in counter 74 in the lead/lag delay calculation phase. This confirmation step may be repeated several times as desired.

This paragraph describes the operation of FIG. 3 for the path adjustment and alignment phase. Specifically, a write counter 80 is responsive to a delta signal on line 82 and a write inhibit signal on line 84 from the lock state machine 76. A read counter 86 is responsive to a read inhibit signal on line 88 from the lock state machine 76. The write counter 80 and the read counter 86 are connected to a write address input line 81 and a read address input line 83, respectively, of the random access memory 52 and they respectively control the writing of information on the lead channel line 31 into the random access memory 52 and the reading of that information from the random access memory 52. A variable time delay is introduced by the random access memory 52 for each ATM cell appearing on line 31. The magnitude of the time delay is determined by the length of time between the writing of an ATM cell into the random access memory 52 as controlled by the write counter 80 and the reading of that ATM cell out of the random access memory 52 as controlled by the read counter 86. The amount of time between the writing of an ATM cell into the random access memory 52 and the reading of that ATM cell out of the random access memory 52 is determined by the delta signal which is produced by the lock state machine 76 in response to the counter 74's determination of the number of cells between matching user cells in the ATM data bit streams in lines 28 and 32.

This paragraph describes the operation of FIG. 3 for the alignment confirmation phase. Specifically, the alignment of the two signals achieved in the path adjustment and alignment phase is then confirmed by comparing all cells on lines 33 and 54, using comparator 90. If several cells in a row are found to be equal, then alignment is confirmed; otherwise the alignment procedure is resumed at the lead/lag delay calculation phase.

This paragraph describes the operation of FIG. 3 for the alignment monitoring phase. In this regard, the circuit of FIG. 3 also includes a further monitoring circuit which determines if there is any lag or lead in the user cells in the lag channel line 33 and the output of the random access memory 52 on line 54 in the lead channel. This monitoring circuit includes a comparator 90 which has one input connected to the lag channel line 33 and another input connected to the output of the random access memory on line 54 in the lead channel. The comparator 90 determines if there is a mismatch between the user data on lag channel line 33 and the output line 54. If there is a mismatch, the comparator 90 produces an unlock signal on line 92 which is directed to the lock state machine 76.

The cell type detection circuit 94 of FIG. 3 also provides an indication on a line 95 of the presence of idle cells in the output lines of the switching element 58. The signal on line 95 is directed to the input of the lock state machine 76, which is responsive to that signal to produce a start signal on line 101 to cause user cells to be latched in the latch 64.

Figure 4:
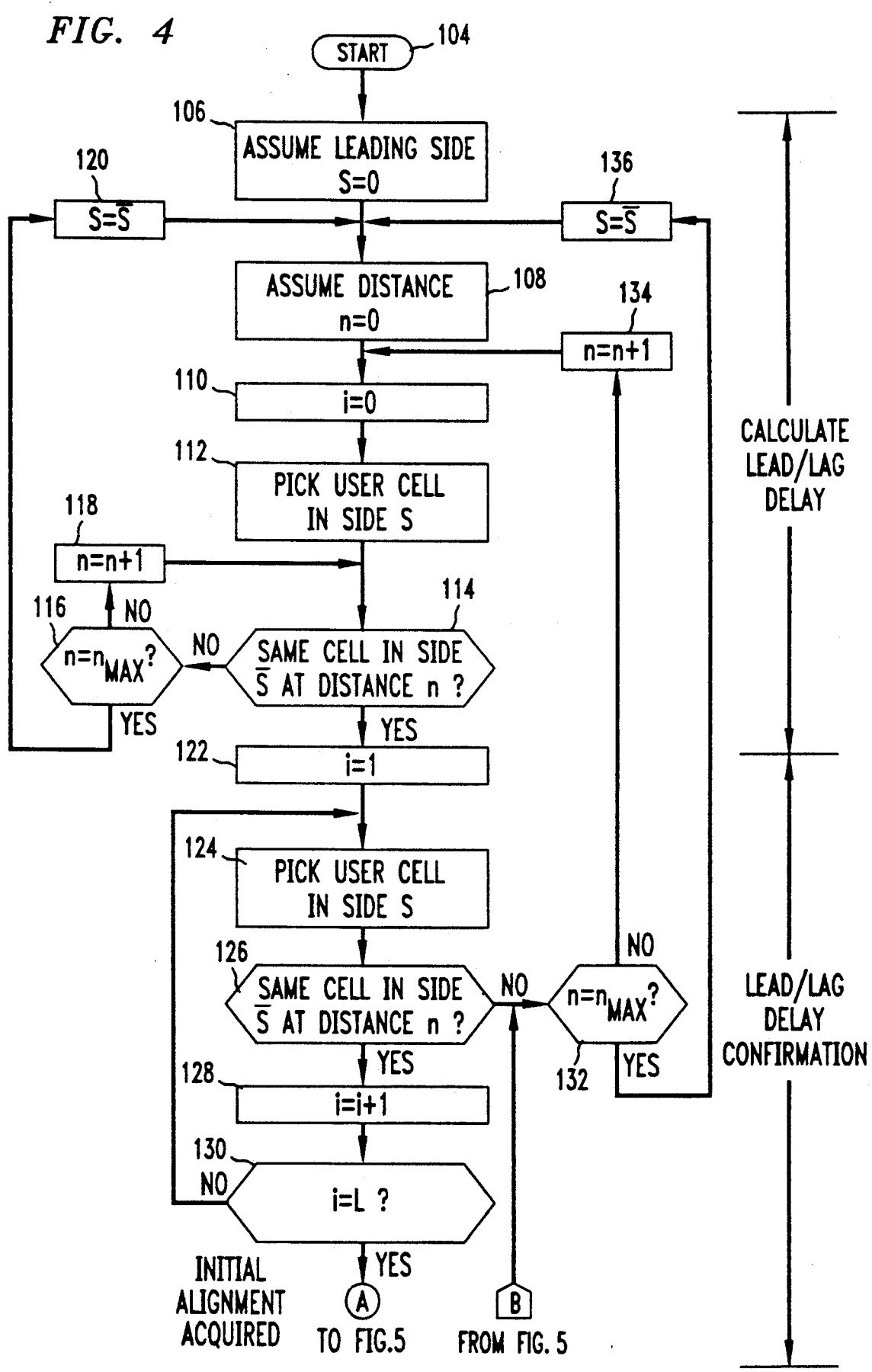
FIG. 4 is a flow chart representing electronic circuitry which accomplishes delay calculation and confirmation procedures used in an errorless line protection switching arrangement in accordance with the principles of this invention.
Figure 5:
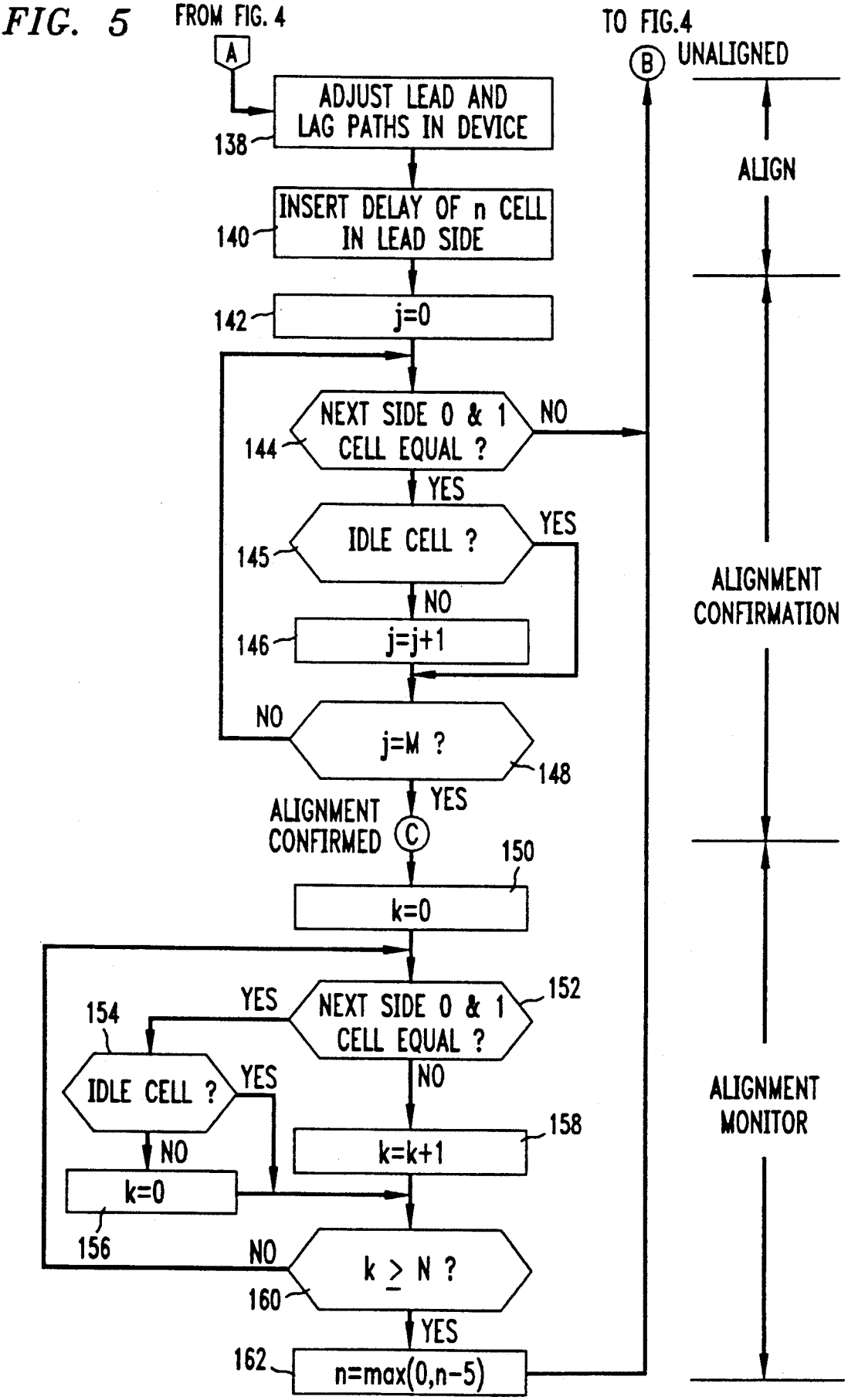
FIG. 5 is a continuation of the flow chart of FIG. 4 representing electronic circuitry which accomplishes alignment, alignment confirmation, and monitoring procedures performed in the course of errorless line protection switching in accordance with the principles of this invention.

FIGS. 4 and 5 are flow charts illustrating details of the operation of the circuit of FIG. 3. FIG. 4 shows a flow chart defining procedures by which the active or standby line is identified as the leading line, procedures which determine the amount the cell stream flowing in the identified leading line leads the cell stream flowing in the other of the active or standby lines, and a confirmation procedure which ensures that the lagging and leading lines have been correctly identified. FIG. 5 shows a flow chart defining a circuit which directs leading user data to a lead channel and lagging user data to a lag channel, aligns the user data in the lead and lag channels, engages in a confirmation procedure which ensures that the cell stream in the lead and lag channels are truly aligned, and employs continued monitoring of the alignment status of the user data in the lead and lag channels.

In FIG. 4, one of the sides is assumed to be the leading side and a user cell is selected from that side. The same cell is looked for in the other side up to a distance $n_{max}$ cells downstream from the selected user cell. The value of $n_{max}$ is the maximum allowable number of cells of delay difference between the two sides. If the same cell is not found within $n_{max}$ cells downstream, the direction of the search is reversed. If a match is found, at a distance n cells downstream, which is less than $n_{max}$ cells downstream, then this result is verified L additional times. may be, for example, from about 5 to about 10. In the example of FIG. 4, the result may be verified 7 additional times that a user cell on the assumed leading side has an exact match n cells downstream on the lagging side. If such a match is not found L additional times, then the search is continued in the same direction. If an exact match is found L additional times, then the correct value of n is confirmed.

In the alignment phase, the switching circuit is configured so that the leading path passes through a variable delay unit. A delay of n cells is inserted into the lead path. In the example shown in FIG. 3, this may be accomplished by entering all cells on line 31 into RAM 52 and not reading any cells out of the RAM 52 on line 54 until n cells are stored in RAM 52. When the next cell appears on line 31, after n cells have been stored in RAM 52, it is written into RAM 52 and the cell which was the first to have been written into the RAM 52 is read out of the RAM 52 and sent to the input of the selection element 48 on line 54. (If the lagging path were going through the variable delay unit for some reason, appropriately setting the delay in the lead channel would entail (a) removing idle cells from that path until the delay was depleted, (b) switching the lead path to the variable delay unit errorlessly, and (c) generating idle cells in the lead path at the output of the memory 52 to build out the delay. See the discussion of FIGS. 6–9 below for one example of this. Removing and adding idle cells on in-service paths can be done slowly to minimize the downstream effects on an abrupt phase change.)

After the delay of n cells has been inserted into the lead path, it is next verified that the following M consecutive user cells, for example, the next 7 consecutive user cells, are equal on the now aligned active and standby lines. If it is found that the next M consecutive user cells on the active line are not identical to the M consecutive user cells on the redundant line, it is assumed that the signals from the active and standby lines are not aligned and the delta calculation phase described above is entered at the current value of n. If it is found that the next M cells are equal, alignment is confirmed and the operation of the circuit of FIG. 5 proceeds to a monitor phase described below.

The circuit defined by the flow chart of FIG. 4 begins its operation in a start block 104. The circuit of FIG. 4 assumes arbitrarily in block 106 that the user data in one of the active or standby lines is leading the user data in the other of the active or standby lines. The number of cells n between matching user cells in the ATM bit streams in the active and standby lines is initially assumed to be zero in block 108. An index i is set equal to zero in block 110. The index i counts the number of consecutive matches in this phase. An arbitrary user cell is selected in block 112. The other bit stream is examined in block 114 to see if the same cell picked in block 112 appears in the examined bit stream n cells downstream, in this initial case zero cells downstream. If the same cell is not found n cells downstream in the examined bit stream, then a check is made in block 116 to see if the current value of n is equal to the value of a predetermined value $n_{max}$. If n is not equal to $n_{max}$, then n is incremented by one in block 118 and the procedure of block 114 is repeated. The procedure of block 114 is repeated and n is incremented by one until either a match is found or the value of n reaches the value of $n_{max}$, as determined in block 116. When the value of n reaches the value of $n_{max}$, signifying that a wrong assumption was made about which of the active or standby lines contains leading user data, a change (SWAP) is made in block 120 about that assumption and the operation of blocks 108, 110, 112, 114, 116, and 118 is repeated until the same cell is found by block 114 in the line which has been now assumed to be the lagging line. When the circuit of FIG. 4 follows the yes path from block 114, the one of the active or standby lines currently assumed to be the line carrying leading user data is the actual line carrying leading user data. The value of the variable n, when the circuit of FIG. 4 takes the yes path from block 114, indicating that a match was found, is the amount by which one of the active or standby lines leads the other of those lines.

When block 114 has made a yes determination, the circuit of FIG. 4 then sets an index i equal to one in block 122. An arbitrary user cell in side S is picked in block 124. A determination then is made in block 126 to see if the same cell appears in side $\bar{S}$ at a distance n cells downstream from the user cell picked in block 124. If the same cell is found by block 126, then the index i is incremented by one in block 128 and a check is made in block 130 to see if the index i equals the predetermined value L mentioned above. If i does not equal L, as determined in block 130, then the operations of block 124 and subsequent blocks are repeated with another user cell picked from side S. If i equals L, as determined in block 130, then the operation of the circuit of FIG. 4 recognizes that initial alignment has been acquired and proceeds to perform the operation of FIG. 5 beginning with a block labeled A in FIG. 5.

If the same cell is not found in side $\bar{S}$ by block 126, then a check is made in block 132 to see if n is equal to $n_{max}$. If n is not equal to $n_{max}$, then n is incremented by one in block 134 and the operation of block 110 and subsequent blocks is repeated. If n equals $n_{max}$, as determined in block 132, then the assumption as to which of the active or standby sides is leading is changed in block 136 and the operation of block 108 and subsequent blocks is repeated.

More specifically in reference to FIG. 5, when initial alignment is acquired and the operation of FIG. 5 is commenced at block A, the active and standby paths in the device are directed to the appropriate ones of the lead and lag channel lines in block 138. A delay of n cells then is inserted into the lead channel by block 140. There are four cases which must be handled by the circuitry of FIG. 5 in the course of performing the operations of blocks 138 and 140.

The first case is a situation where the active cell stream is lagging the redundant cell stream and the active cell stream is currently directed by the switching element 30 to the lag channel line 33 in FIG. 3. In this case, the lagging active cell stream is already in the correct path. The leading nonactive cell stream is directed to the lead channel line 31 by the switching element 30. The timing of a write signal on line 81 and a read signal on line 83 is set so that reading a given cell from the RAM 52 lags the writing of that cell into the RAM 52 by an amount equal to the delta offset n computed by the circuit of FIG. 4. Bit-by-bit comparison may be made by the comparator 90 when the timing of the read and write signals has been appropriately set in this manner. The comparison may be limited to only a portion of each cell to reduce the comparator circuitry.

The second case is a situation where the active cell stream is leading the redundant cell stream. The leading active cell stream is currently directed by the switching element 30 to the lead channel line 31. In this case, the leading active cell stream is in the correct path. The lagging non-active cell stream is directed to the lag channel line 33 by the switching element 30. If the current timing offset between the write signal on line 81 and the read signal on line 83 is greater than the delta offset calculated by the circuit of FIG. 4, then the write operation must be inhibited for idle cells thus allowing the read signal on line 83 to catch up with the write signal on line 81. This procedure reduces the delay build out in the RAM 52 without disrupting the active signal. Conversely, if the current timing offset is less than the delta calculated by the circuit of FIG. 4, then the read signal on line 83 must be inhibited and idle cells must be output from the RAM 52, thus allowing the write signal on line 81 to move away from the read signal on line 83. This procedure increases the delay build out in the variable delay buffer RAM 52 without disrupting the active signal. Since continuous outputting of idle cells may affect the operation of downstream equipment, idle cells could be inserted into the output of the RAM 52 at as slow a rate as necessary, for example, idle cells could be inserted once for every 32 cells, until the timing offset between writing into and reading out of the RAM 52 equals the computed delta. When this is the case, the comparator 90 may perform bit-by-bit comparison.

The third case is a situation where the active cell stream leads the redundant cell stream and the active cell stream is currently directed to the lag channel line 33 by the switching element 30. In this situation, the active channel is in the wrong path. The delay provided by the RAM 52 first is reduced to zero and then the active cell stream is switched to both the lag and lead channel lines 31 and 33 by the switching element 30. Since both paths have the same data with no delay difference at the switching element 48, the active cell stream could now be errorlessly switched to the output line 26 by the switching element 30. The non-active cell stream could now be switched to the lag path line 33 by the switching element 48. The signals on lines 81 and 83 then are adjusted similarly to the second case above to provide the time delay to align user cells on lines 33 and 54 and the comparator 90 then may commence bit-by-bit comparisons.

The fourth case is a situation where the active cell stream lags the redundant cell stream and the active cell stream is currently directed by the switching element 30 to the lead channel line 31. Again, the active cell stream is in the wrong path. The active cell stream is switched to both lines 31 and 33 as in the third case above. The signals on lines 81 and 83 may be adjusted to reduce the delay by one cell delay at a time by inhibiting idle cells from being written into the RAM 52. When the delay buffer 52 is completely empty, the cell streams on lines 33 and 54 have the same data without any delay difference at the switch element 48 and the switching element 48 can errorlessly switch the active cell stream on the line 33 of the lag channel to the output line 26. The switching element 30 can then direct the redundant cell stream to the lead channel line 31 and the signals on lines 81 and 83 are adjusted similarly to the first case above to provide the delta computed by the circuit of FIG. 4. The comparator 90 then commences bit-by-bit comparison.

After the operations of blocks 138 and 140 in FIG. 5 have been completed, an index j is set equal to zero in block 142. The index j counts the number of consecutive non-idle matches with no intervening idle mismatches. The circuit of FIG. 5 then makes a determination in block 144 as to whether or not the cells in the active and standby lines are equal after the setting of the delay in block 140. If there is no match between the cells in the active and standby lines, the two lines are declared to be unaligned and the operation of the circuit returns to FIG. 4 as indicated by the block labeled B. If the cells do match, as determined in block 144, then the circuit of FIG. 5 determines if the cell is an idle cell in block 145. If the cell is not an idle cell, the circuit of FIG. 5 increments the index j by one in block 146 and a determination is made in block 148 to see if j is equal to a predetermined value M. The value of M is the number of consecutive matching user cells required to confirm alignment. If j has not reached the value of M, the circuit of FIG. 5 returns to the input of block 144 and the operations of blocks 144 and 146 are repeated until j reaches the value of M. When the value of j equals the value of M, block 148 indicates alignment confirmation in block C. If the cell is an idle cell at block 145, the circuit of FIG. 5 skips the operation of block 146 and performs the operation of block 148.

When alignment has been confirmed, the circuit of FIG. 5 enters into a monitor phase which detects loss of alignment. One possible way of detecting loss of alignment is to look for N consecutive user cells being unequal in the aligned sections of the lead and lag channels. This is shown in FIG. 5. If loss of alignment is detected, the circuit of FIG. 5 returns to the alignment phase. As shown in FIG. 5, it may be possible to speed up reacquisition by using the last known value of the distance n minus a few cells, for example, n minus 5 cells, rather than restarting the circuit at n=0.

After alignment is indicated as confirmed in block C, the circuit of FIG. 5 then sets an index k equal to zero in block 150. A determination then is made in block 152 to see if the next cells in the lead and lag channels are equal. If they are equal, a determination is made in block 154 to see if the cells just compared in block 152 are idle cells. If they are idle cells, the circuit of FIG. 5 proceeds to the input of block 160. If the cells are not idle cells, then the value of k is set equal to zero in block 156. If the cells compared in block 152 do not match, the value of k is changed to the value of k+1 in block 158. Block 160 then determines if k is greater than or equal to a predetermined value N. The value of N indicates the number of consecutive user cell mismatches required to detect a loss of alignment. For example, N may have a value of 8. If k is not greater than or equal to N, then the operation of the circuit of FIG. 5 proceeds to the input of block 152 where its operation and that of successive blocks already described is repeated. If k is greater than or equal to N, as determined in block 160, then the variable n is set equal to the maximum of zero or a few less than n, e.g. n−5, in block 162 and an unaligned condition is declared in block B. The operation of the circuit of FIG. 5 proceeds to the point in the operation of the circuit of FIG. 4 indicated by the block labeled B in FIG. 4 continuing with the last value of n.

Simply looking for N cells being unequal to detect loss of alignment is adequate in many situations. Under some traffic conditions, a more complex algorithm would yield better results. This is because N would have to be made large to avoid a burst of errors from causing unnecessary realignment. However, making N large increases the probability that one out of N cells may be equal even if the sides are out of alignment. The replacement of block 156 in the lower part of FIG. 5 with a block which sets k equal to the greater of 0 or k−0.1, i.e., "k=max (0,k−0.1)" is one possible solution which makes a probabilistic decision on equal and unequal cells using different weights for equal cells and unequal cells. In this example, unequal cells are given a weight of +1 and equal user cells are given a weight of −0.1. (Equal idle cells have a weight of 0.) This modified arrangement of FIG. 5 will result in an out of alignment condition being detected even if some cells happen to be equal.

Figure 6:
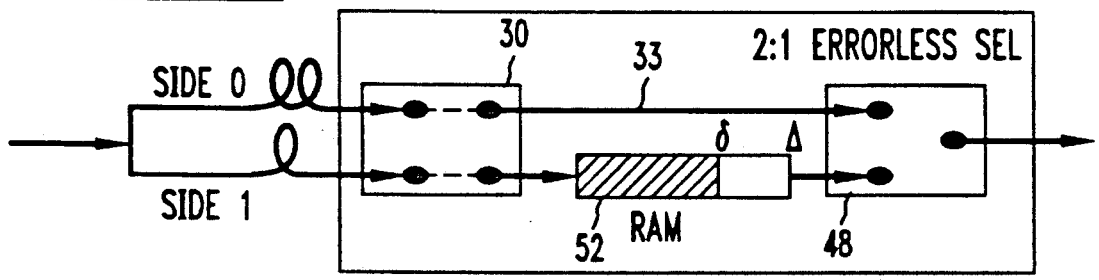
FIGS. 6-9 illustrate errorless switching in accordance with the principles of this invention in a situation where the standby path length has changed during service.

One important aspect of errorless switching of ATM signals in accordance with this invention is that delay can be changed in the signal paths by dropping or adding idle cells from the cell streams when appropriate. This aspect permits errorless switching of ATM signals from one path to the other even if the standby path length changes during the service period. In particular, even if a standby path which originally is longer than the active path is replaced by a standby path which is now shorter than the active path, errorless switching can be achieved by this invention as illustrated in FIGS. 6 to 9. In FIG. 6, it is assumed that side 1 currently is the active side, side 0 is the standby side, and the user data in side 1 leads the user data in the standby side 0. Therefore, the switching element 30 is configured so that it directs the active side 1 to the input of the random access memory 52. The random access memory 52 is configured so that it adds a time delay $\delta$ to the data on the active side 1 so that the user data on sides 0 and 1 are aligned at the input of the switching element 48. The switching element 30 is configured so that the user data on side 0 is connected directly to the input of the selection element 48 without substantial time delay. This arrangement is set up by the circuits and procedures discussed above.

Figure 7:
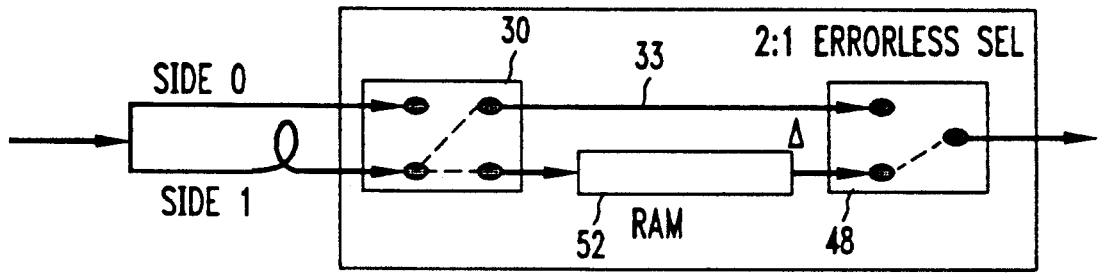

In FIG. 7, it is assumed that the standby side 0 has been replaced by a path which is now shorter than the active side 1 path. Therefore, to perform an errorless switching operation from side 1 to side 0, the random access memory 52 must be applied to the side 0. This is achieved by first reconfiguring the switching element 30 to dual feed the side 1 signals to both of the outputs of the switching element 30 as shown in FIG. 6b. Then whenever it comes time for an idle cell to appear at the input of the random access memory 52, it is dropped and a user cell is generated at the output of the RAM 52. By this procedure, the delay provided by RAM 52 is reduced by one cell. Continuing this process, the delay in RAM 52 is depleted completely over a period of time. An errorless switch may then be performed by the switching element 48 because the output of the random access memory 52 and the signal on line 33 are aligned. This alignment is very simple because the signals on line 33 and on the output of the random access memory 52 are truly identical in the configuration of FIG. 6b and also because there is no delay difference between these two signals. The random access memory 52 is now free to be used on the shorter standby path.

Figure 8:
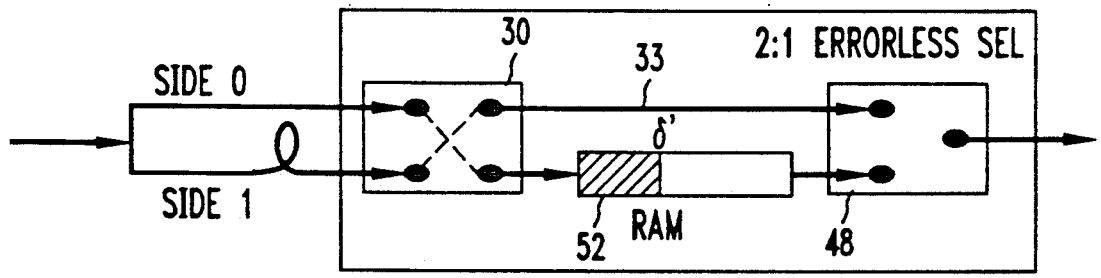
Figure 9:
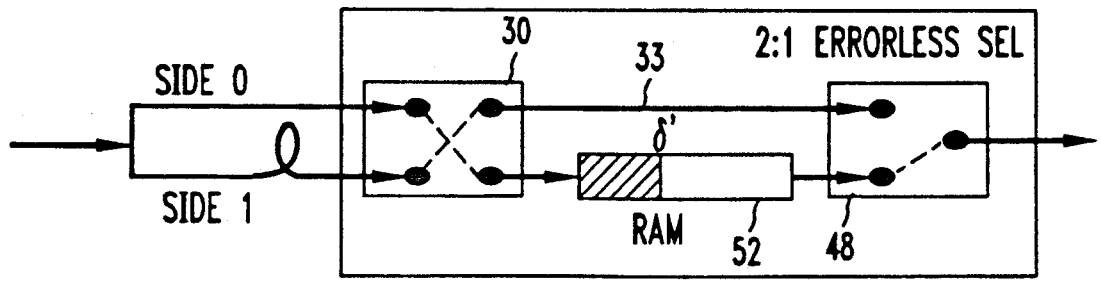

The signal on side 0 is now fed to the random access memory 52 by appropriate configuration of the switching element 30 as shown in FIG. 8. The random access memory 52 is directed to provide a time delay $\delta'$ which results in alignment of the user data on line 33 and the user data on the output of the random access memory 52. The alignment procedures and circuitry described above are used to accomplish this. Errorless switching may then be achieved by the selection element 48 as shown in FIG. 9. Errorless switching from side 1 to side 0 may thus be accomplished even after the side 0 length has changed.

The size of the variable delay buffer or random access memory needed for effective errorless switching may be determined by assuming that optical signals pass through glass fibers with an $n_{glass}$ equal to 1.5 at a speed $c=3\times10^8$ m/sec. The following Table II summarizes the variable delay buffer size needed for two different differential distances between the active and standby paths, one appropriate for intraoffice protection switching and the other for interoffice protection switching as two examples. The table below reports the needed variable delay buffer size for three different kinds of signals, STM-1, STM-4c, and STM-16c signals. The calculated sizes are based on the STM rates. However, the internal rate could be somewhat higher than the STM rates. In that case, the variable delay buffer sizes would also be proportionately higher.

TABLE I

| | Signal | | | |
|---|---|---|---|---|
| | Differential Distance 400 m | | Differential Distance 10K m | |
| | Variable Delay Buffer Size | | | |
| | In Units of Kbytes | In Units of Cell numbers | In Units of Kbytes | In Units of Cell numbers |
| 155.52 Mbit/sec. (STM-1) | 0.04 | 0.7 | 0.97 | 18.3 |
| 622.08 Mbit/sec. (STM-4c) | 0.16 | 3 | 3.89 | 73.4 |
| 2.488 Gbit/sec. (STM-16c) | 0.62 | 12 | 15.55 | 293.4 |

Those skilled in the art will appreciate that there are many modifications which may be made to the examples of the invention described above which would fall within the scope of the claimed invention.

The invention described up to this point covers the fundamental aspects of the hitless or errorless switching circuit and its design. In many practical implementations of such a system, some enhancements may be needed to handle special cases. Slight modifications may be needed to the basic circuit to accommodate these enhancements, but the basic structure of this invention is not changed.

Five such enhancements are described below, but the scope of the invention is not limited to only these five.

ACCOMMODATION OF OAM CELLS THAT MAY BE DIFFERENT ON THE TWO SIDES

In addition to the idle and user cells described above, networks also use special cells for operations, administration and maintenance (OAM cells). These cells replace idle cells in the transmission stream. These OAM cells are of different types, but can be classified into two basic types. The first type, a Type 1 OAM cell, is one where the OAM cells are identical in position and content on the two sides (0 and 1). These OAM cells are treated identically to user cells by this invention. The second type of cell, a Type 2 OAM cell, is one where the OAM cell on one side may correspond to an idle cell, or a different Type 2 OAM cell, on the other side. Type 2 cells are typically created or dropped on the transmit side of line interfaces 14 and 16 in FIG. 1, so they may be different on the two sides in the transmission lines 18 and 20. Type 1 OAM cells are typically created or dropped prior to line 12 in FIG. 1, so that they are always identical on the two transmission lines 18 and 20. OAM cells are marked so that it is possible to identify them as Type 1 or Type 2 and, thus, easy to account for them in the following way. The comparator 90 in FIG. 3 may be designed to designate a Type 2 OAM cell on one side as always being equal to a corresponding Type 2 OAM cell or idle cell on the other side even though they are actually different. For other types of cells (user, idle, and Type 1 OAM cells) the comparator indicates equality only if all bits of the two cells are equal. This method will accommodate Type 2 OAM cells or any other cells that have replaced an idle cell on one side only, as long as that cell can be identified as such a replacement cell.

LOCAL INSERTION OF IDLE CELLS

Even if the cell streams are identical on lines 18 and 20 in FIG. 2, there may be a small amount of variation in their frequency. This is commonly handled by a process called "stuffing," whereby the data rate is increased slightly on both sides and equalized. In an ATM system, it is natural to use idle cells for stuffing. Since these are locally inserted within the system, in line interfaces 21 and 23, these cells shall be called L-idle cells, and are marked to distinguish them from the idle cells that come from the lines 18 and 20. Even though the presence of these cells now cause a potential variability of the spacing between user cells, these cells are specially marked and may, therefore, be accommodated by this invention as follows (or by a method equivalent to it): If an L-idle cell is detected on the lead side, it is dropped (not written into the RAM 52); if an L-idle cell is detected on the lag side, readout of data from the RAM 52 is temporarily suspended while a corresponding L-idle cell is inserted on the lead side at the output of RAM 52, thereby rendering the two data streams equal.

SIMPLIFIED COMPARISON OF CELLS IN ACQUISITION PHASE

In the acquisition and acquisition confirmation phases of the alignment process as described, it is necessary to store a complete cell of information in block 64 of FIG. 5, since it is necessary to compare the data in this block to other data at a later time. It is possible to reduce the storage requirement from that of a whole cell to a fraction thereof by storing either: (i) a selected portion of the cell including, for example, its header information, or (ii) a checksum, or similar cell signature which is much smaller than the cell itself, such as a cyclic redundancy check or parity, computed over the entire cell rather than the cell itself. Of these two methods, method (ii) has the advantage that it incorporates data from the entire cell and is thus less likely to lead to false matches.

REDUCTION OF STORAGE FOR IDLE CELLS

Since only one bit is needed to designate a cell as an idle cell, it is not necessary to store the complete cell, but only one bit of information per idle cell (plus a small amount of encoding overhead). Thus, in the case where a certain percentage of idle cells is guaranteed, the variable delay buffer cap may be reduced by the same percentage.

PROGRAMMABILITY

All normally predetermined values, e.g., L, M, N, and $n_{max}$ can, in fact, be programmable, so that the circuit can be programmed with optimal values that are tailored to the statistics of the type of traffic expected. It is also possible to automate this programmability adaptively, so that the optimal parameters may be determined automatically, based on measured values of the actual traffic statistics.

We claim:
1. An errorless line protection apparatus, comprising:
   a means for receiving data from an active line;
   a means for receiving data from a standby line;
   a means for determining whether the data on the active line leads or lags the data on the standby line;
   a means for selecting one of the data on the active line or the data on the standby line for connecting that selected data to an output line;
   a switching means responsive to the determining means for directing leading data to a lead channel between the switching means and the selection means, the lead channel containing a controllable amount of time delay up to the maximum amount that the leading data is expected to lead the lagging data and for directing lagging data to a lag channel directly connecting the switching means to the selecting means.

2. The apparatus of claim 1, in which the lead channel has an amount of time delay such that the data from the active line and the data from the standby line are aligned in the lead and lag channels.

3. The apparatus of claim 2, in which the lead channel contains a random access memory which provides the controllable amount of time delay in the lead channel.

4. The apparatus of claim 1, in which the determining means comprises:

a means for selecting a predetermined segment of data from one of the active or standby lines; and a means for finding an identical segment of data in the other of the active or standby lines.

5. The apparatus of claim 4, in which the means for finding an identical segment of data comprises a means for sequentially comparing segments of data in the other of the active or standby lines, up to a maximum distance downstream in the other of the active or standby lines, with the predetermined segment of data from the one of the active or standby lines.

6. The apparatus of claim 1, further comprising:
a means responsive to the determining means for aligning the data received from the active and standby lines.

7. The apparatus of claim 6, in which the aligning means controls the amount of delay in the lead channel.

8. The apparatus of claim 1, in which the determining means comprises a means for ascertaining the magnitude of the lead or lag between the data from the active and standby lines.

9. The apparatus of claim 8, in which the determining means further comprises a means for repeating a predetermined number of times the determination of which of the active or standby lines carries leading data and the ascertainment of the magnitude of the lead or lag between the data on the active and standby lines to confirm initial determination of which line carries leading data and ascertainment of the magnitude of the lead or lag.

10. The apparatus of claim 9, in which the predetermined number of times is from about 5 to 10.

11. The apparatus of claim 6, in which the aligning means further comprises a means for confirming that the data from the active and standby lines is aligned by checking that a predetermined number of sequential segments of data in the lead and lag channels is the same.

12. The apparatus of claim 11, in which the predetermined number of segments is from about 5 to about 10.

13. The apparatus of claim 6, in which the alignment means further comprises a probabilistic alignment monitor for determining whether or not there is continued alignment in the data in the lead and lag channels.

14. An errorless line protection apparatus, comprising:
an active line for transporting data from a first location to a second location over a first path;
a standby line for transporting the data from the first location to the second location over a second path;
a means for determining which of the data on the active line or the data on the standby line leads the data on the other line and the amount by which that data leads the data on the other line;
a variable delay unit which is capable of providing a delay up to a maximum amount that the data on the leading one of the active and standby lines is expected to lead the data on the lagging one of the active and standby lines;
a means responsive to the determining means for switching the leading one of the active or standby lines to an input of a variable delay unit;
a means responsive to the determining means for adjusting the delay of the variable delay unit to align the data from the active and standby lines;
a selection element having at least two inputs and an output;

a means for directing the output of the variable delay unit to one input of the selection element; and a means for directing the lagging one of the active or standby lines to a second input of the selection element through an element which is capable of delaying the data on the lagging line by no more than a maximum amount which is less than the maximum amount able to be provided by the variable delay unit.

15. An errorless line protection apparatus for a communication system carrying asynchronous transfer mode data, comprising:
a means for receiving asynchronous transfer mode data containing user and idle cells from an active line;
a means for receiving from a standby line asynchronous transfer mode data containing user and idle cells which are the same as the user cells and idle cells from the active line;
a means responsive to at least the user cells from the active and standby lines for determining whether or not the user cells from one of the active or standby lines leads or lags the user cells from the other of the active or standby lines;
a means for selecting one of the asynchronous transfer mode data from the active line or the asynchronous transfer mode data from the standby line and directing that selected data to an output line;
a switching means responsive to the determining means for directing leading asynchronous transfer mode data to a lead channel between the switching means and the selection means, the lead channel containing a controllable amount of time delay up to the maximum amount leading asynchronous transfer mode data is expected to lead the lagging asynchronous transfer mode data and for directing lagging asynchronous tranfer mode data to a lag channel directly connecting the switching means to the selecting means.

16. The apparatus of claim 15, in which the controllable amount of delay in the lead channel may be changed by a means for changing the number of idle cells in the asynchronous transfer mode data directed to the lead channel.

17. The apparatus of claim 16, in which the changing means comprises a means for deleting selected idle cells from the asynchronous transfer mode data directed to the lead channel.

18. The apparatus of claim 15, further comprising a means responsive to the determining means for aligning the cells in the asynchronous transfer mode data in the lead and lag channels.

19. The apparatus of claim 18, in which the aligning means controls the amount of time delay present in the lead channel.

20. The apparatus of claim 18, further comprising a means responsive to a change in path length associated with the active and standby lines which causes a misalignment of the previously aligned cells in the lead and lag channels for adjusting the controlling time delay in the lead channel to realign the cells in the lead and lag channels.

21. The apparatus of claim 20, in which the means responsive to a change in path length comprises a means for changing which of the asynchronous mode transfer data from the active or standby lines is directed to the lead channel and the lag channel.

22. An asynchronous transfer mode communications network, comprising:

a first office for transmitting asynchronous transfer mode data;

a second office for receiving the asynchronous transfer mode data;

an active line for carrying asynchronous transfer mode data comprising user cells and idle cells from the first office to the second office;

a standby line for carrying asynchronous transfer mode data comprising user cells and idle cells along a path which is physically different from a path over which the active line carries data, such that a lead or lag between asynchronous transfer mode data is produced at the second office;

a means responsive to the asynchronous transfer mode data in the active and standby lines for determining the polarity and magnitude of the lead or lag between the data in the active line and the standby lines;

a means in the second office for selecting one of the asynchronous transfer mode data from the active line or the standby line for switching that selected data to an output line;

a switching means responsive to the determining means for directing leading asynchronous transfer mode data to a lead channel between the switching means and the selection means, the lead channel containing a controllable amount of time delay up to a maximum amount that the leading asynchronous transfer mode data is expected to lead the lagging asynchronous transfer mode data, and for directing lagging asynchronous transfer mode data to a lag channel directly connecting the switching means to the selecting means;

a means responsive to the determining means for controlling the amount of delay in the lead channel to align the asynchronous transfer mode data in the lead and lag channels; and a means responsive to the asynchronous transfer mode data in the lead and lag channels for monitoring the alignment of the data in those two channels.

23. A method of performing errorless protection switching in an asynchronous transfer mode communications network, comprising:

receiving at a first point in the network asynchronous transfer mode data sent on an active line from a second point in the network, the asynchronous transfer mode data comprising user cells representing intelligence transmitted from the first point to the second point and one or more idle cells;

receiving at the first point in the network the asynchronous transfer mode data sent on a standby line from the second point in the network, the asynchronous transfer mode data comprising user and idle cells;

determining the magnitude and polarity of any lead or lag between the asynchronous transfer mode data received from the active line and the asynchronous transfer mode data received from the standby line;

directing leading asynchronous transfer mode data to a lead channel containing a controllable amount of time delay up to the maximum amount that leading data is expected to lead the lagging data;

directing lagging asynchronous transfer mode data to a lag channel containing a maximum amount of time delay which is less than the maximum amount of time delay in the lead channel;

controlling the amount of delay in one or both of the lead and lag channels so that asynchronous transfer mode data in the lead channel is aligned with asynchronous transfer mode data in the lag channel; and selecting one of the lead channel or the lag channel and switching the selected channel to an output.

24. The method of claim 23, further comprising the step of:

changing which of the asynchronous transfer mode data from the active line or the standby line is directed to the lead channel and the lag channel in response to a change in the lead or lag between the data from the active line and the standby line.

25. The method of claim 23, further comprising the step of:

changing the controllable amount of time delay in the lead channel in response to a change in the lead or lag between the data from the active line and the standby line.

26. The method of claim 23, further comprising the step of:

switching in an errorless manner between which of the data from the active and standby lines is directed to the output line.

27. The apparatus of claim 6, in which the aligning means changes the controllable amount of time delay at a predetermined rate in response to a loss of alignment in the data in the active and standby lines.

28. The apparatus of claim 6, further comprising a means for monitoring the alignment of the data aligned by the aligning means.

29. The apparatus of claim 1, in which the switching means comprises a 2×2 switch.

30. The apparatus of claim 9, in which the predetermined number is programmable.

31. The apparatus of claim 9, in which the predetermined number is adaptively programmable.

32. The apparatus of claim 11, in which the predetermined number is programmable.

33. The apparatus of claim 11, in which the predetermined number is adaptively programmable.

34. The apparatus of claim 5, in which the maximum distance is programmable.

35. The apparatus of claim 5, in which the maximum distance is adaptively programmable.

36. The apparatus of claim 28, in which the data from the active and standby lines is in the form of cells and the alignment monitoring means determines that the data received from the active and standby lines is not aligned in response to a predetermined consecutive number of unequal cells received from the active and standby lines.

37. The apparatus of claim 36, in which the predetermined consecutive number is programmable.

38. The apparatus of claim 36, in which the predetermined consecutive number is adaptively programmable.

39. The apparatus of claim 36, in which the alignment monitoring means comprises a means for comparing cells from the active and standby lines and producing an equality output signal when the cells from the active and standby lines have a predetermined relationship.

40. The apparatus of claim 39, in which the comparing means produces an equality output signal in response to predetermined cell from one of the active or standby lines and a predetermined cell from the other of the active and standby lines which is not the same as the predetermined cell from the one of the active or standby lines.

41. The apparatus of claim 1, in which the data from the active and standby lines is in the form of cells some of which are idle cells, and further comprising a means for selectively adding and deleting idle cells from the active and standby lines.

42. The apparatus of claim 1, in which the data from the active and standby lines is in the form of cells and the determining means comprises a means for storing a selected portion of a cell from one of the active or standby lines and comparing the stored portion with a corresponding portion of a cell in the other of the active or standby lines.

43. The apparatus of claim 1, in which the data from the active and standby lines is in the form of cells and the determining means comprises a means for storing a computed value derived from at least a portion of a cell from one of the active and standby lines and comparing the computed value to a computed value derived from at least a portion of a cell from the other of the active or standby lines.

44. The apparatus of claim 14, in which the data from the active and standby lines is in the form of cells some of which are idle cells and the variable delay unit stores predetermined portions of the idle cells.

45. The apparatus of claim 43, in which the computed values are checksums.

46. The apparatus of claim 43, in which the computed values are cyclic redundancy checks.

47. The apparatus of claim 43, in which the computed values are values related to parity.

* * * * *